United States Patent [19]
Linnell

[11] Patent Number: 5,881,895
[45] Date of Patent: Mar. 16, 1999

[54] COLLAPSIBLE CONTAINER

[75] Inventor: Michael Charles Linnell, Barking, Great Britain

[73] Assignees: Michael Charles Linell; Linda Rose Linnell; Michael Charles Linnell, Jnr.; Sharon Ann Manning, all of, Great Britain

[21] Appl. No.: 669,534
[22] PCT Filed: Jan. 12, 1995
[86] PCT No.: PCT/GB95/00061
  § 371 Date: Jul. 12, 1996
  § 102(e) Date: Jul. 12, 1996
[87] PCT Pub. No.: WO95/19285
  PCT Pub. Date: Jul. 20, 1995

[30] Foreign Application Priority Data

Jan. 12, 1994 [GB] United Kingdom .................. 9400477
Apr. 16, 1994 [GB] United Kingdom .................. 9407582
Jun. 29, 1994 [GB] United Kingdom .................. 9413086
Sep. 8, 1994 [GB] United Kingdom .................. 9418123

[51] Int. Cl.$^6$ ..................................................... A47F 5/00
[52] U.S. Cl. ................................................. 220/4.28; 220/6
[58] Field of Search .................................. 220/4.28, 1.5, 220/400, 401, 6

[56] References Cited

U.S. PATENT DOCUMENTS 3,847,299  11/1974  Page et al. ............................. 220/4.28
4,884,935  12/1989  Smith et al. ............................. 220/6 X

*Primary Examiner*—Steven Pollard
*Attorney, Agent, or Firm*—Gary M. Nath; Harold L. Novick; Nath & Associates

[57] ABSTRACT

Collapsible containers configurable to provide a plurality of seaparate compartments are described, each having a back wall (84) carrying elements (104B, 104C) hingeably movable from positions parallel to the back wall to positions extending normally of that wall and defining compartments. In one embodiment stackable rigid structures (formed from inter-engageable boarding pieces) are placed within the container with the movable elements located between pairs of structures. In another embodiment the movable elements are rigid and form (when extended) bases for trays and lie immediately beneath side supports hinged to the back wall and rotatable from positions parallel to that wall to positions extending normally of that wall to act as end (and possibly) divider walls for the trays. A front wall (110) for each tray may be provided by a web carried between free edges of the side supports or by a rigid front wall part hinged to the free edge of the movable element and rotatable from a position parallel to that element to position extending normally thereof. The container may be of a foldable fabric, the movable parts being pockets carrying rigid planar pieces stitched to the back wall and resting when extended against parts of the frame. When not in use the fabric part may be folded and the frame collapsed for storage or transportation. The container may also be implemented in plates of metal or other rigid material with hinges between the movable parts.

37 Claims, 8 Drawing Sheets

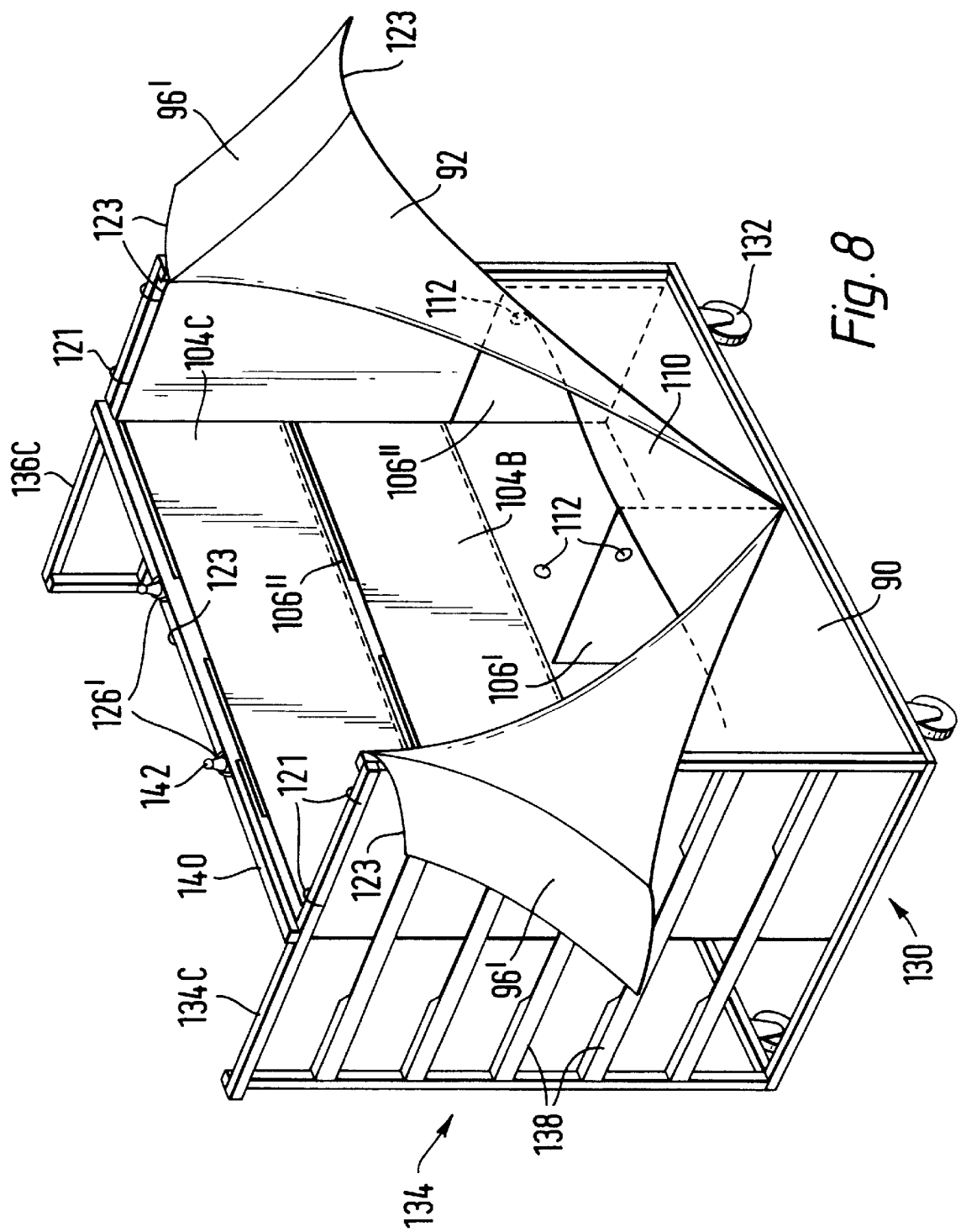

COLLAPSIBLE CONTAINER

TECHNICAL FIELD

The invention relates to containers, and in particular to containers which may be used for both storage and transport of various items.

BACKGROUND ART

One application of the invention is the secure transport of postal items from and between sorting offices and provides for the ready transport of those items between offices after they have been sorted.

Traditionally mail is carried to and from, and between, Post Offices in mail bags—fabric bags—in which all the mail items for a particular place (for example a City, a general postal or zip code) is placed.

On arrival at the it's destination the mail is removed from the bag and then re-sorted for particular sub-divisions of the area to which it has been sent (for example: a particular postman's walk, blocks or more detailed postal and zip codes).

When transporting postal items in a mail bag they become jumbled and when removed from the bag must be re-sorted in order that the address and postal or zip code can be seen. With the increasing use of mechanised sorting the need for ensuring that all the items of mail have their addresses on a surface which is to pass a machine scanner has increased and the traditional method of transporting mail requires the use of a number of operatives to ensure that this is the case by checking the orientation of the mail items.

It will be appreciated therefore that there is significant manpower required simply taking mail from a mail bag and reorienting it so that the surfaces on which the addresses and postal codes are located are in a position in which they can readily be scanned by a machine.

Proposals have been made, and in some countries have been put into practice, that after the initial sorting of mail it is transported between Post Offices in rigid trays in which all the mail items for a particular destination are stacked side-by-side such that the address on each of the items is orientated in the same way.

To effect this a number of rigid trays each carrying mail are placed in a large container, usually of metal, which is used to carry all the mail items to be taken from one particular Post Office to another at which the mail in the trays may again be sorted for delivery.

When transported in this way the mail in the trays does not need to be re-sorted to ensure the addresses on the mail items are in the same orientation—the mail items are held in the desired orientation within the rigid trays.

This proposal substantially reduces the cost of sorting the mail but requires the use of trays which are costly to produce and heavy and the use of containers (for the trays) which are costly, heavy and bulky. The result therefore is that the transportation cost of the trays and the containers—both when full of mail and when empty—is significant.

It is an object of the present invention to provide apparatus usable for storing and transporting mail items which substantially alleviates the difficulties of the traditional method of transporting mail between Post Offices and overcomes the disadvantages of the above noted proposals.

Objects of the invention include the provision of forms of container for use in transporting, inter alia mail, which substantially alleviates and/or overcomes the difficulties noted above.

DISCLOSURE OF THE INVENTION

In one aspect the invention provides a collapsible container releasably mountable in a frame work and when so mounted configurable to provide a plurality of separate compartments, the container being of a flexible frabric and, comprising a back wall having mounted thereon at least one set of parts, each of which comprises two or more rigid side support elements each movable from a first position in which it is held against or parallel to the back wall to a second position in which it extends normally of the back wall, and a base support element movable from a first position in which it lies generally parallel to the back wall to a second position on which it extends normally of the back wall, the side and base support elements being located on the back wall such that when they are in their respective second positions they define compartments of the container.

Each said side support element preferably comprises a fabric pocket carrying therein a rigid planar piece.

Each base support element preferably comprises one or more fabric pockets each carrying therein a rigid planar piece.

Said planar pieces are desirably of generally rectangular form.

Advantageously, the base and side support elements are hingeably connected to the back wall of the container by stitching the fabric of the support element to said back wall.

The back wall may, when said base and side support elements are in their first positions, be released from the framework and be folded.

The uppermost edge, in use, of the back wall is preferably provided with means for engaging the framework so that the back wall is held in an extended condition.

The base support elements of each said set of parts may be formed in two sections, which are foldable from a first position in which they overlie one another and are generally parallel to the back wall of the container to said second position.

The back wall is desirably filmable and comprises a series of separate pockets each containing a rigid planar piece.

The edge of each base support element spaced from the back wall may be provided with a fabric front wall part hingeably interconnected by being stitched thereto, said front wall part being movable about the hinge axis from a position in which it lies on said base support element to a position in which it upstands from the base support element and extends across the width thereof.

The edges of the side support elements spaced from their connection to the back wall may be interconnected by a flexible web.

Each base support element may have associated therewith three side support elements, said side support elements being connected to the back wall at equal spacing.

The elements, when in their said second positions are supported upon a base wall of the framework or upon the upper edges of the side support elements next to and below them.

The container may further comprises fabric base and top walls,, side walls and front and rear walls, wherein the top wall is integrally attached to the back wall and releasably attachable to the upper margins of the front side walls.

In such an arrangement the front wall may be in two parts each of which is integrally attached to the base wall and a respective side wall and opposed margins of two front wall parts are releasably attached one to the other to form a single front wall when the container is closed.

Desirably, the relatable attachment of the top wall to the side and front wall parts, and of the two parts of the front wall to each other, is effected by zippers.

The means for holding the base and side support elements in said first positions in the framework comprises any suitable stud, hook or the like arrangement.

Desirably, the material of the textile fabric of the container and of the rigid planar parts is polypropylene.

In a second aspect the invention provides a combination with one or more textile fabric containers, the rigid framework having a rectangular base frame with side frames upstanding from two opposed sides thereof, the side frames comprising sheets of metal forming rigid walls on opposite sides of said container, said sheets carrying metal runner elements for supporting the base support elements of each fabric container in their second positions.

In a third aspect the invention provides a container comprising a rigid framework having a rectangular base frame with side frames upstanding from two opposed sides thereof, wherein said side frames comprise posts interconnected by runner elements for supporting the base support elements of each fabric container in their said second positions.

In a fourth aspect the invention provides a container comprising a rigid framework in combination with one or more fabric containers as defined above, the rigid framework having a rectangular base frame with side frames upstanding from two opposed sides thereof, wherein a cross bar extends between the midpoints of the upper edge of each side frame and each fabric container back wall has at its upper edge loops of material attachable to hook means on the cross bar to hold each fabric container extended.

In a fifth aspect the invention provides a container comprising a framework for supporting one of more textile fabric container parts each of which has a back wall, base and side support elements, the framework in use supporting the back wall and supporting the base and side support elements when in their said second positions, wherein each fabric container part is further provided with top, side, and front walls, and wherein the fabric container is held supported in the framework by fabric material pieces forming loops near the upper edges of the side and back walls of the fabric container part and which are engagable by hook members forming part of said framework.

The framework may include elements movable between positions in which each fabric container part is contracted and in which each fabric container part is held extended by the framework.

Such a framework may be adapted for stacking upon a similar framework when contracted.

The elements of the framework which are movable, are hingeably interconnected with other elements of the framework.

The framework may be provided with a rigid base formed integrally on opposed sides thereof with first rigid side frame parts extending substantially normally of the base, second rigid side frame parts being hingeably coupled to each of said first side frame parts, each being movable between a position lying in the plane of its associated first side frame part and substantially parallel to the plane or the opposed second side frame of the framework.

The framework preferably includes a cross-bar operably to extend between the second side supports and to hold the second side frame parts.

Desirably, the cross-bar is releasably attachable to both second side frame parts.

The cross-bar may, however, be releasably attachable to one second side frame part and hingeably coupled to the other second side frame part.

Advantageously, the hingeable interconnection of the side frame parts to the first said frame parts at different sides of the frame base is effected at different distances from the frame base.

The fabric container part is preferably integrally attached to the framework.

A base wall of the fabric container part is attached to the framework base.

The fabric container part may be attachable to the cross-bar.

The first and/or second side frame parts comprise a network of interconnected rigid runner elements.

Alternatively the first and/or second side frame comprises solid, panel, members on which are supported rigid runner elements.

The above and other aspects, features and advantages of the invention will become apparent from the following description of embodiments of the invention now made with reference to the accompanying drawings, in which:

There may be provided a rigid base front wall part hingeably interconnected to the base wall at the edge thereof spaced from the back wall and movable about the hinge axis from a position in which it lies on the base wall to a position in which it upstands from the base wall and extends between the side frames of the container.

Again, there may be provided a rigid base front wall part hingeably interconnected to each base support element at the edge thereof spaced from the back wall and movable about the hinge axis from a position in which it lies on said base support element to a position in which it upstands from the base support element and extends between the side frames of the container.

Advantageously, there are provided a plurality of side support elements hingeably connected to the peripheral edges of the back wall, each being movable from a position in which it is held parallel to the back wall to a position in which it extends generally normally of the back wall and is supported by elements of the side frames.

The base support elements may each comprise two or more rigid base support element sections which are hingeably interconnected.

Desirably the side frames comprise sheets of metal forming rigid walls on opposite sides of said container, said sheets carrying metal runner elements for supporting the base support elements in use.

Alternatively, the side frames comprise posts interconnected by runner elements for supporting the base support elements in use.

In each embodiment of the invention the various parts of the container are provided with means enabling their releasable engagement one with another.

Said means may be selected from the group comprising any suitable magnetic catch, hook, clip, clamp, hook and eye or other arrangement.

Preferably, however, said means comprises co-operating patches of VELCRO carried on the parts of the container.

In a second aspect of invention provides container configurable to provide a plurality of separate compartments, the container comprising in combination a framework and a flexible fabric part with a back wall having mounted thereon at least one set of parts, each of which sets comprises two or more rigid side support elements each movable from a first position in which it is held against or parallel to the back wall to a second position in which in extends normally of the back wall, and a base support element movable from a first position in which it lies parallel with the back wall to a second position in which it extends normally of the back wall and is supported by said runner elements of the framework, the side and base support elements being located on the back wall such that when they are in their respective second positions they define compartments of the container.

The base support elements of each of said set of parts may be formed in two sections which are foldable from a first position in which they overlie one another and are generally parallel to the back wall of the container to said second position.

Desirably, said back wall is foldable, and comprises a series of separate pockets each containing a rigid planar piece.

Advantageously, the material of the container and of the rigid planar parts within the container is polypropylene.

Preferably, the container further comprises base and top walls, side walls and front and rear walls, the top wall being integrally attached to the rear wall and releasably attachable to the upper margins of the front and side walls.

The front wall may be in two parts each of which is integrally attached to the base wall and a respective side wall and opposed margins of two front wall parts may be releasably attachable one to the other to form a single front wall when the container is closed.

The releasable attachment of the top wall to the side and front walls parts, and of the two parts of the front wall to each other, may be effected using any suitable means; preferably, zippers.

The support means for holding the base and side support elements in said first positions may comprise any suitable stud, hook or the like arrangement.

The base and side support elements are preferably of the same fabric as the back wall and are attached to the back wall by stitching.

The back wall is preferably provided at the upper margins thereof with fabric lugs by means of which it may be supported in said framework.

In a third aspect the invention provides a framework for supporting a fabric container part having a back wall, base and side support elements, the framework in use supporting the back wall and supporting the base and side support elements when in their said second positions, the fabric container being further provided with top, side, and front walls.

The fabric container part may be held supported in the frame by any suitable hook, stud, clip or clamp arrangement.

The fabric container part may be held supported in the frame by fabric material pieces forming loops near the upper edges of side and rear walls of the fabric container part and which are engagable by hook members forming part of said framework.

The framework may include elements movable between positions in which the or each fabric container part is contracted and in which the or each fabric container part is held extended by the framework.

Preferably, said framework is adapted for stacking upon a similar framework when contracted.

Desirably, the elements of the framework which are movable, are hingeably interconnected with other elements of the framework.

The framework may have a rigid base formed integrally on opposed sides thereof with first rigid side frame parts extending substantially normally of the base, second rigid side frame parts being hingeably coupled to each of said first side frame parts, each second side frame part being movable between a position extending generally across the base to a position lying in the plane of its associated first side frame part and substantially parallel to the plane of the opposed second side frame part of the framework.

The framework may include rigid means for holding the second side frame parts in the planes of their associated first side frame parts.

Said means preferably comprises a cross-bar operable to extend between the second side frame parts; and releasably attachable to both second side frame parts or, alternatively, which is releasably attachable to one second side frame part and hingeably coupled to the other second side frame part.

The hingeable interconnection of the second side frame parts to the first said side frame parts at different sides of the frame base is preferably effected at different distances from the frame base.

A fabric container part may be integrally attached to the framework.

A base wall of the fabric container part may be attached to the base of the frame.

The fabric container part may be attachable to the cross-bar.

The framework may be provided with wheels by means of which it may be moved, and with advantage with one or more handles and/or brakes.

The framework may be formed such that first and/or second side frame parts comprise a network of interconnected rigid runner elements; or, alternatively, such that the first and/or second side frame parts are provided as solid, panel, members on which are supported rigid runner elements.

The above and other aspects, features and advantages of the invention will become apparent from the following description of embodiments of the invention now made with reference to the accompanying drawings, in which:

BRIEF DESCRIPTION OF THE DRAWINGS

FIG. 8 shows a container comprising the fabric container part of FIG. 2 in the framework of FIG. 4.

MODES OF CARRYING OUT THE INVENTION

Figure 1:
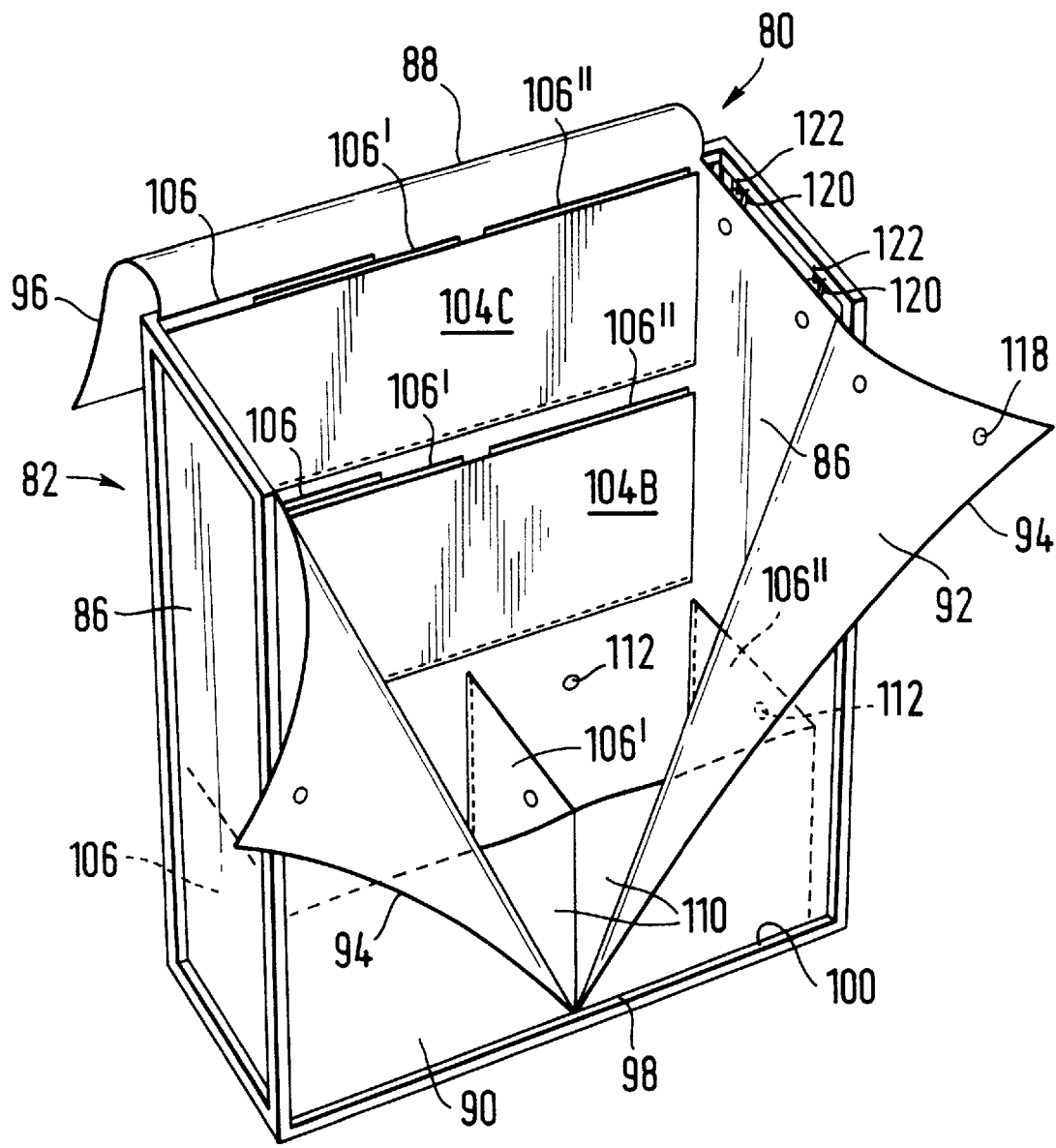
FIG. 1 shows a first container embodying the invention in a partially filled condition.

A container embodying the invention is shown in FIG. 1 to comprise a flexible fabric container part 80 held generally in a cuboid shape in a frame 82.

Container part 80 comprises a back wall 84, side walls 86, a top wall 88 and a front wall in two parts 90 and 92 as shown. The two parts 90 and 92 are releasably attachable one to the other by a zipper 94.

The top wall 88 of the container is formed integrally with the back wall 84 and is releasably attachable to the upper margins of the side walls 86 and the front wall parts 90 and 92 by zippers 96 as shown.

The fabric container part 80 is provided with a base wall 98 in the form of a base support element—a pocket the margins of which are stitched or otherwise permanently attached to the lower margins of the side walls 96 and the front wall parts 90 and 92 as shown at 100.

The pocket 98 includes two generally rectangular rigid planar pieces 102 which extend the width, (as viewed in FIGS. 1 and 2), and substantially half the depth of, the container fabric part 80.

The container back wall 84 also carries three sets of side support elements 104A, 104B and 104C. Each set of side support elements comprises three elements 106, 106' and 106" stitched onto the fabric of the container at the side edges of the back wall (106 and 106") and substantially at the midpoint of the back wall 106').

Each side support element 106 comprises a fabric pocket in which there is located a rigid planar piece 108.

The elements 106 are stitched onto the fabric of the back wall 84 to form a hingeable connection for each element 106 so that it may be moved from a position in which it lies parallel to the back wall 84 to a position in which it extends substantially normally thereof.

The axes of the hingeable connections between the back wall 84 and the elements 106 are, as can be seen, substantially parallel and, within each set of elements 104A, 104B and 104C are in register—that is to say they are mounted at the same height on back wall 84.

Figure 2:
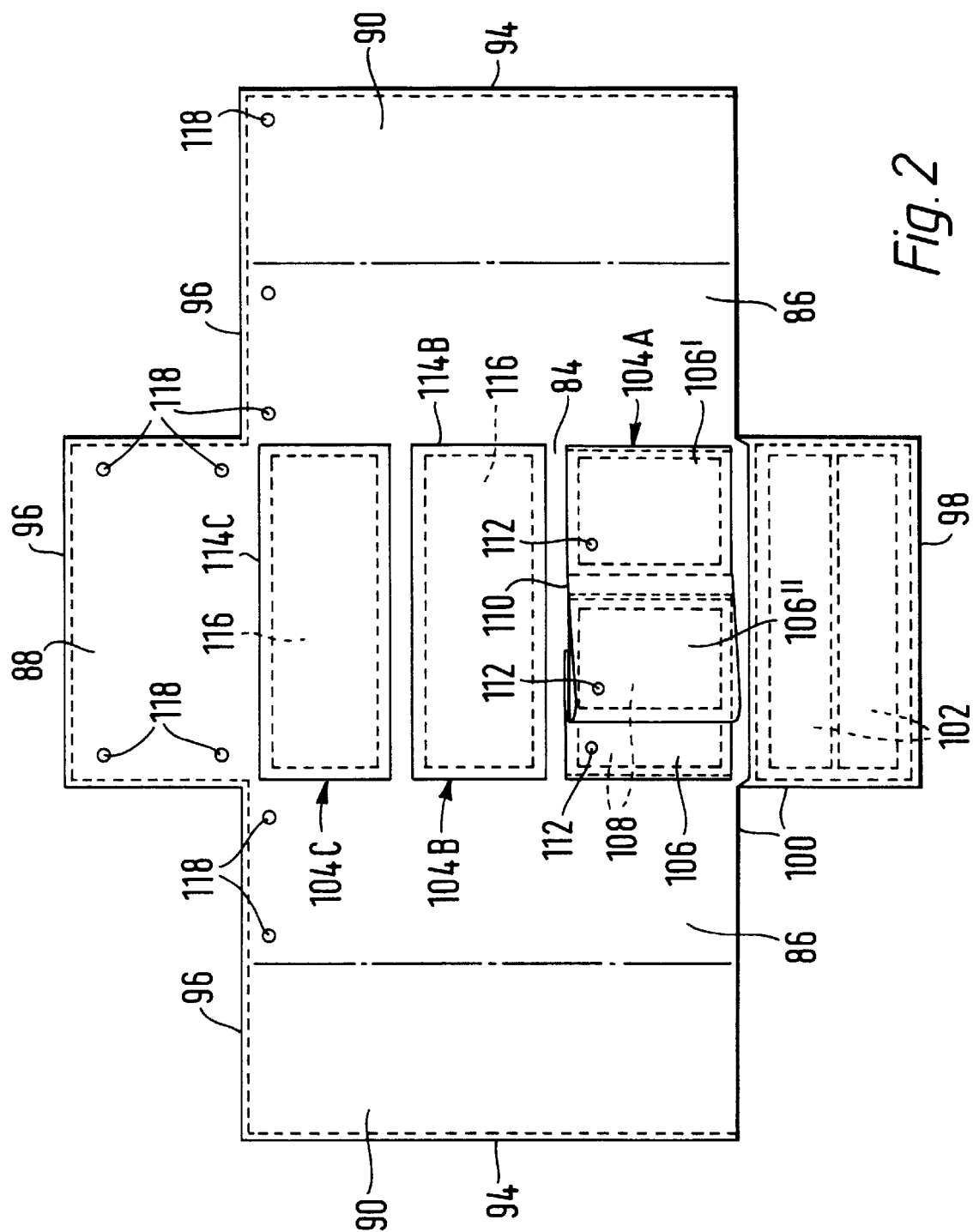
FIG. 2 illustrates a stage in the manufacture of the fabric part of the container of FIG. 1.

The free edges of the elements 106, the edges spaced from the back wall 84 are interconnected by flexible plastic material webs 110 as can be seen from FIGS. 1 and 2.

Each of the elements 106 may be held in a position in which it lies substantially parallel to the back wall 84 by any suitable means—however it is preferred that cooperating attachment patches 112 such as described above with reference to the first embodiment provided on the back wall 84 and the elements 106 (or on the facing surfaces of the elements 106 when they overlie one another) be used to hold the elements 106 in a position substantially parallel to the back wall 84.

It will be appreciated that when the elements 106 of the lowermost set 104A of elements are moved to positions in which they extend substantially normally of the back wall 84 they form, with the base wall 98 of the container, a compartmentalised tray into which items of mail may be placed.

It will be further seen that any mail placed in the compartmentalised tray formed by the elements 106 of the lowermost set of elements 104A and the base wall 98 of the container will be held in the particular orientation in which they are placed within the container.

As can be seen the extent of the side support elements 106 is substantially equal to the extent of the base wall 98 of the container.

Each of the other sets of elements 104B, 104C attached to the back wall 84 comprises, in addition to the side support elements 106, 106' and 106" a base support element 114B and 114C comprising a pocket the size of which is substantially equal to that of the base wall 98 and which contains a single, rigid, planar piece 116.

Each of the base support elements 114 is normally held in a position lying substantially parallel to the back wall 84 once again making use of cooperating attachment patches 112, the attachment patches being provided on the upper surface of the base support elements 114 (as viewed in FIG. 5) and the surfaces of the elements 106 spaced from the back wall 84 when the elements 106 lie parallel to the back wall.

The base support elements 114B of the set of elements immediately above the lowermost set of elements 114A is movable from the position shown in FIG. 1—that is to say lying substantially parallel to the back wall 84 to a position in which it overlies and rests upon the uppermost edges of the side support elements 106 of the lowermost set of elements 104A.

Thus it will be seen that when the compartmentalised tray formed by the lowermost set of elements 104A has been filled with mail items the base support elements 114B of the set of elements 104B may be pulled away from the back wall 84 and allowed to rest on the uppermost edges of the elements 106 of the set of elements 104A.

Thereafter the elements 106 of the set of elements 104B may be moved from positions in which they lie parallel to the back wall 84 to positions in which they extend normally thereof forming another compartmentalised tray to which items of mail may be passed.

Further compartmentalised trays may be provided as the container is filled by moving the elements 114C and 106 of the third set of elements 104C until the container is full.

Thereafter the container may be closed and sealed by moving the top wall 88 until it overlies the compartmentalised trays and, using the zippers 94 and 96, attaching the top, side and front wall together.

Eyelets may be provided, as indicated at 118 in the fabric of the top wall 88 and in the front part walls 90 and 92 through which a piece of rope, twine or string may be passed to seal the container.

Loops of material 120 are provided at the upper margins of the back and side walls enabling the fabric container part to be held on hooks 122 in a generally open position, supported in the frame 82.

Once filled the container may be lifted from the frame and used to transport mail to another office at which it will again be sorted.

The filled container may then be opened allowing mail to be taken from each of the compartmentalised trays in turn and passed directly to a mechanical sorting device—it having been held in a particular relative orientation during transportation.

It will of course be appreciated that the compartmentalised trays are emptied from the top down and as each is emptied the side support elements 116, 96 and base support elements 104 are moved from positions in which they extend normally of the back wall 84 to positions in which they overlie one another and lie substantially parallel to the back wall 84.

Figure 3:
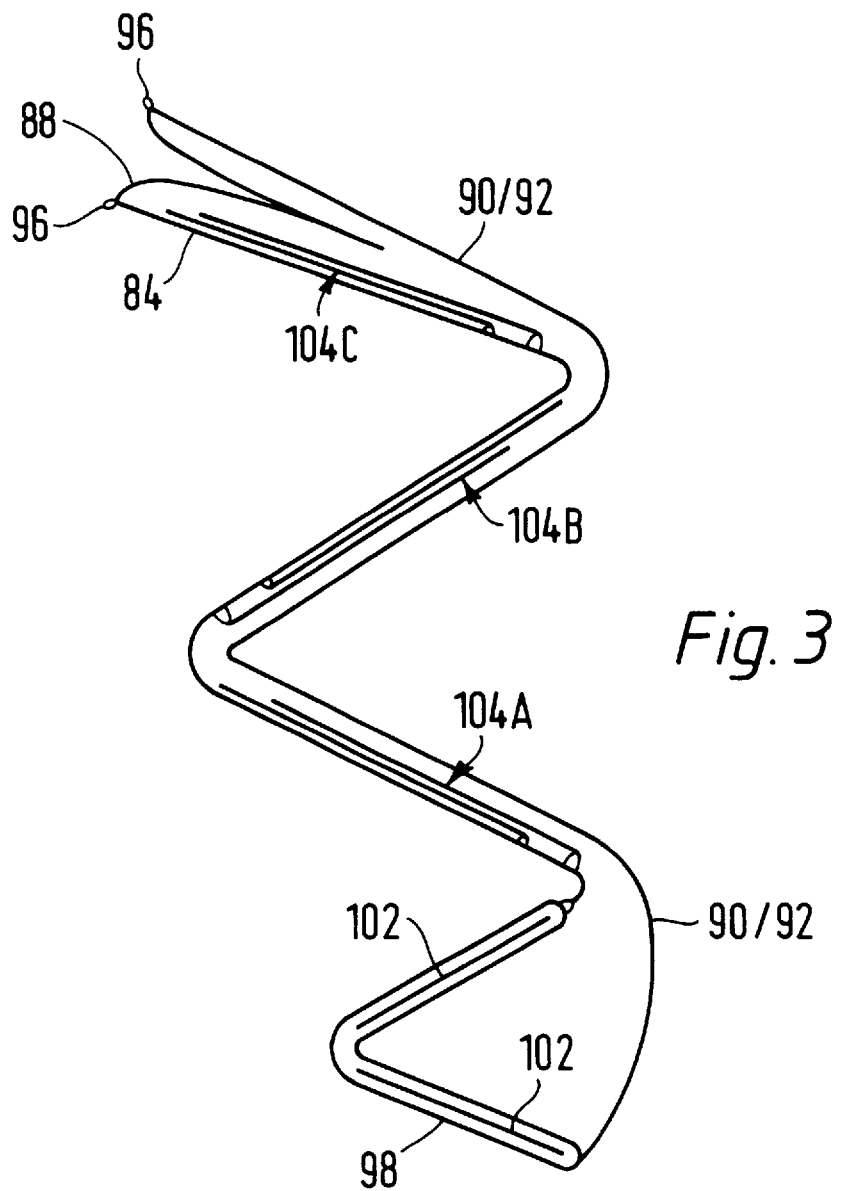
FIG. 3 is a sectional side view of the fabric part of the container of FIGS. 1 and 2, empty and in a semi collapsed condition prior to folding.

If no mail is then to be transported it will be appreciated that the container may be lifted from the frame and folded substantially as shown in FIG. 3. In this arrangement the two rigid pieces 102 forming in the base wall 98 of the container allow that wall to fold substantially about its mid line and thereafter the remainder of the container (with the zippers 94 and 96 closed) may be folded—the side walls folding upon themselves bringing front and back walls together and holding the sets of members 104 in parallel relationship with the back wall.

The rigid nature of the members 102, 108 and 116 provide that the container may be readily folded in concertina fashion as shown in FIG. 3.

The folded fabric container part may then much more readily be transported than if it were rigid and/or if the compartmentalised trays formable in the fabric container part were rigid and incapable of disassembly.

The fabric material of the fabric container part including the pockets is desirably woven polypropylene and the material forming the rigid planar pieces within the support elements is desirably polypropylene boarding. If made of polypropylene the overall weight of the container is very substantially reduced and thus the cost of transporting the container (both when full with mail and when empty) is markedly cut.

Figure 4:
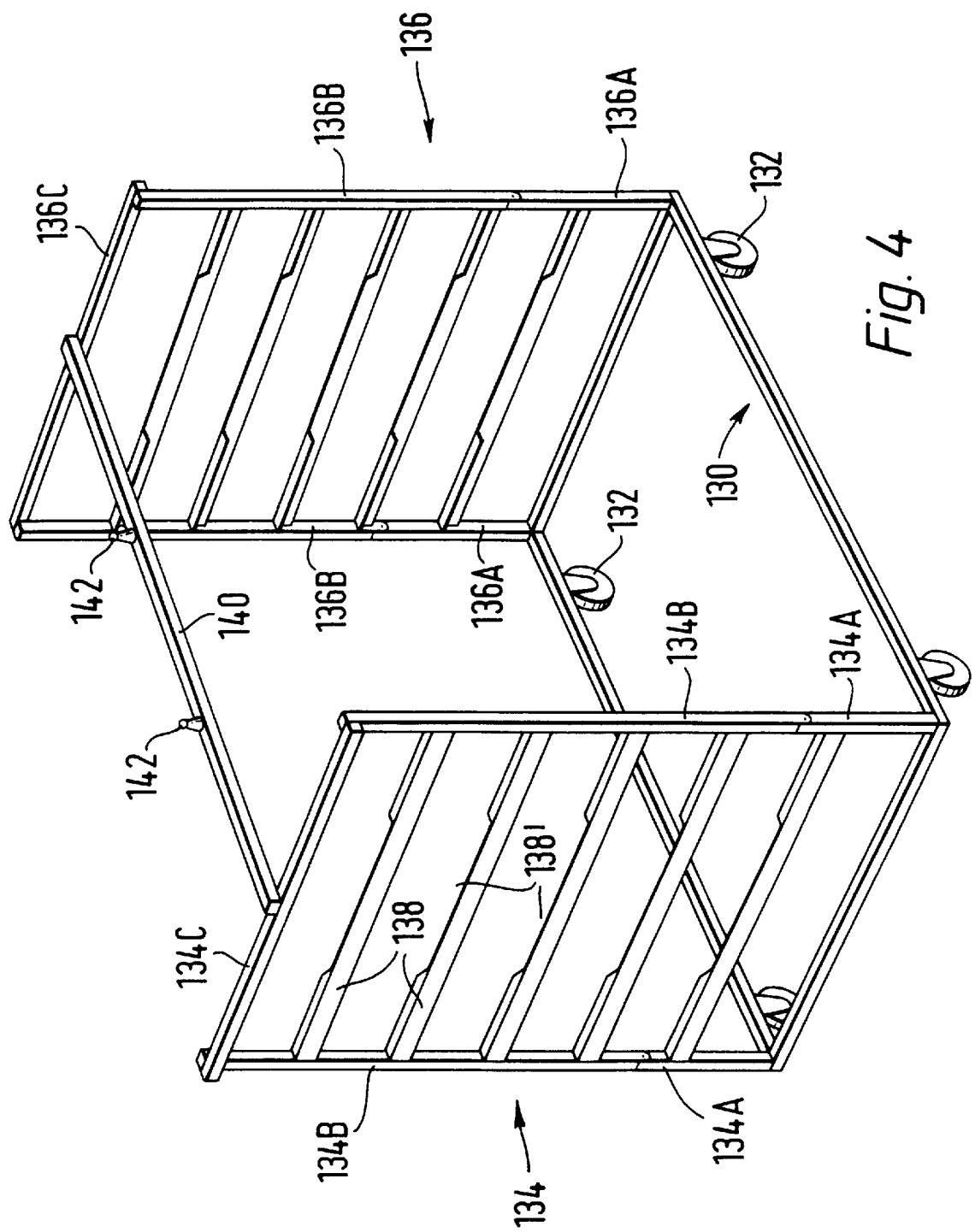
FIG. 4 illustrates a framework of a further container embodying the invention.

FIG. 4 shows a container frame for use in a container embodying the invention to comprise a rectangular base frame 130 of 25 mm$^2$ metal tubing on one face of which, at the four corners of the base frame, are provided caster wheels 132.

On the other face of the base frame 130 and on opposed sides thereof there are provided side frames 134 and 136. The side frames 134 and 136 are generally of the same form and each includes a pair of upstanding posts, 134A, 136A which, it is to be noted, extend to different heights above the base frame 130, the posts 134A (which are the same height) being shorter than the posts 136A (which again are of the same height).

The side frames 134 and 136 include further posts 134B and 136B the lowermost ends of which (as viewed in the Figure) are hingeably connected to the tops of the posts 134A and 136A. The free ends of the posts 134B and 136B are joined by side bars 134C and 136C as shown.

The posts 134B of the side frame 134 are longer than the posts 136B of the side frame 136 by an amount equal to the difference in the lengths of the posts 134A and 136A so that when the posts 134B and 136B are upright (as viewed in FIG. 4) the side bars 134C and 136C are at substantially the same height above the base frame 130.

The side frames 134 and 136 are completed by a number of runners 138 extending between the pairs of posts 134A and 134B, and 136A and 136B as shown.

The runners 138 are provided at spaced intervals above the base frame 130 and each is generally L-shaped in section over most of its length but has a central part 138' which is cut out.

The framework is held in the condition shown in FIG. 4 by a cross-bar 140 hingeably attached to one side bar 134C (or 136C) and engagable with the other side bar 136C (or 134C). Cross bar 140 has two spigots 142 upstanding therefrom as shown.

If desired the side bars 134C and/or 136C may be provided with one or more handles (not shown) to ease movement of the framework and further, if desired, the framework may be provided with a braking system (not shown) for the caster wheels 132.

Figure 5:
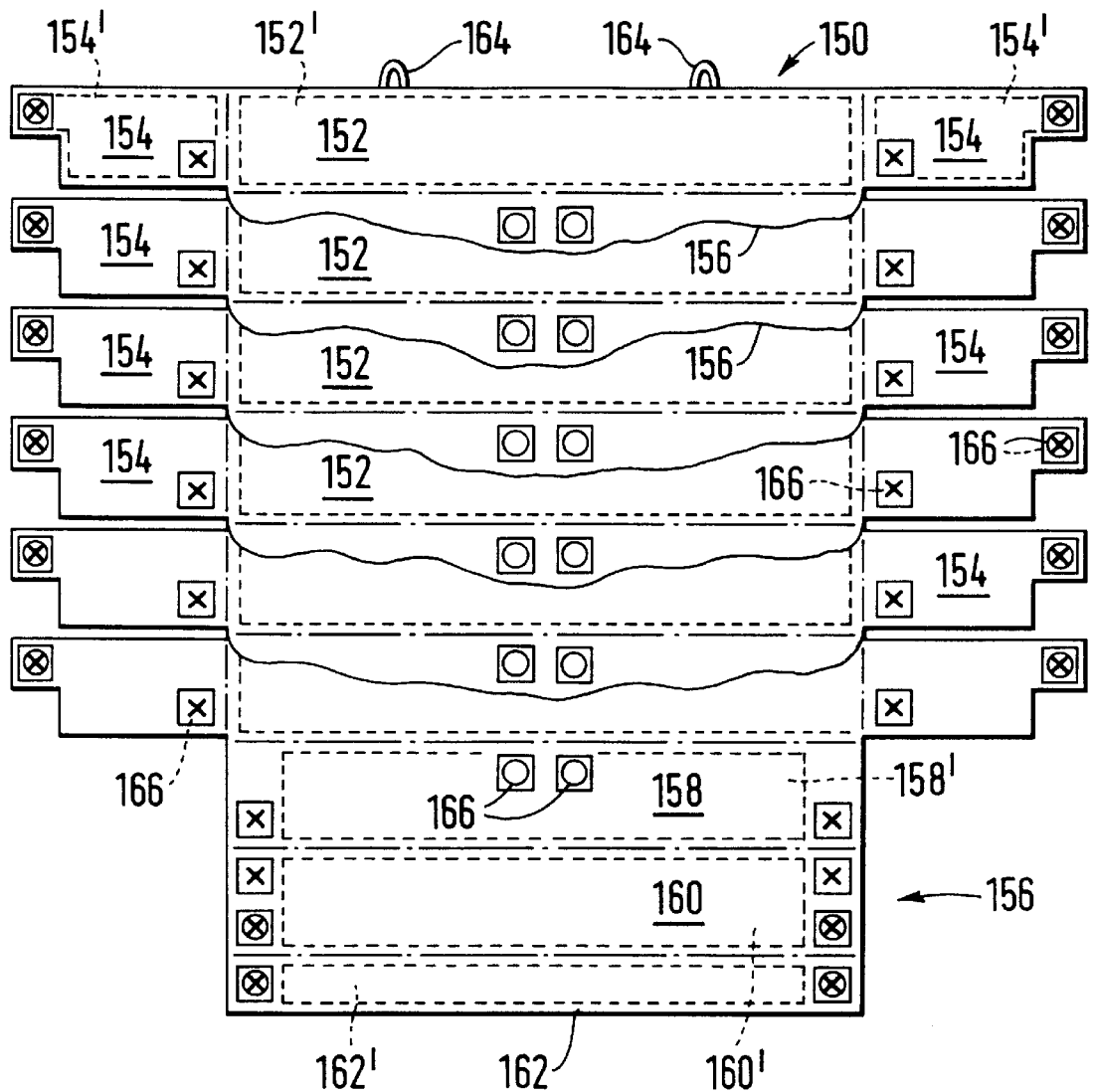
FIG. 5 illustrates a stage in the manufacture of another fabric container part supportable in the framework of FIG. 4.

FIG. 5 shows a fabric container part to be supported in the framework to comprise a back wall 150 formed with a series of pockets 152 which are sealed (for example by stitching) after an appropriately shaped rigid planar element 152' was placed in each of them.

The size of each of the pockets 152 is such that its width (as viewed in FIG. 5) is substantially equal to the width of the base frame 130 as measured between the side frames 134 and 136 and its height is substantially the same as the spacing between the runners 138 carried in the side frames 134 and 136.

The side edges of the back wall 150 of the container are further provided with attached pockets 154 each having the shape shown. Each of the pockets 154 has again been sealed after a rigid planar piece 154' of the appropriate shape has been inserted in it.

The length of each side pocket 154 is substantially equal to one half of the length of the side support bars 134C and 136C.

The lowermost edge of the back wall 150, below the lowest pocket 152 has attached to it a further fabric piece 156 comprising three pockets 158, 160 and 162 each of which has a rigid planar piece (158' 162 and 162') placed in it and is thereafter sealed (for example by stitching).

The height (as viewed in FIG. 5) of the pockets 158 and 160 is substantially equal to one half the length of the side support bars 134C and 136C and their width—as can be seen—is substantially the same as the width of the pockets 152.

The width of the pocket 162 is again substantially equal to the width of the base frame 130 in which the container will be mounted and its height may be half that of the spacing between the runners 138 (as shown) or as desired, but not exceeding the: spacing between the runners 138 in the side frames 134 and 136 of framework.

Fabric pieces 156 (each comprising pockets 158, 160 and 162 including rigid planar elements 158', 160' and 162') are also attached (for example by stitching) to the back wall 150 as indicated at spacings substantially equivalent to the spacing between the runners of 138 in each of the side elements 134 and 136 of the framework. It will be noted that the points of attachment of the fabric pieces 156 (forming pockets 158, 160 and 162) is between the pockets 152 formed in the back wall.

The upper edge of the back wall 150 has loops of fabric 164 attached thereto as shown.

Attachment patches or strips of material similar to those described above with reference to the first two embodiments are then applied to the fabric of the container as shown in FIG. 5 at 166. Those areas where the attachment patches are applied to the viewable, front, surface of the fabric (as seen in FIG. 5) are indicated by the letter O, whilst the letter X indicates where attachment patches are applied to unseen side of the fabric (as viewed in the Figure).

It will be noted that the outermost extremities of the pockets 154 and 156 have attachment patches applied to both surfaces thereof.

The purpose of the attachment patches applied to the container shown in FIG. 5 is twofold; firstly, the patches enable the elements of the container to be held folded against the back wall 150 of the fabric container part and secondly the patches will, as described below, enable the fabric container part to be securely supported in the framework.

To fold the elements of the container against the back wall 150 the side pockets 154 are first folded about the side edges of the back wall such that the attachment patches at their outermost ends come into contact with the patch located generally centrally of the front surface of the back wall 150.

Once each of the side pockets 154 have been folded in this way each of the pocket 162 may be folded about its join line with a pocket 160 so that the attachment patches on their front surfaces will engage and hold the pocket 162 against the pocket 160. Thereafter the pockets 160 and 158 may be folded—again about their join line so that the patches on their back surfaces engage to hold the two together. In this condition the pockets 158, 160 and 162 are now folded and in close contact with one another.

Then by folding pocket 158 about the join line with the back wall 150 the attachment patches adjacent the edges and at the centre of its front surface, are brought into contact with the patches on the back surfaces of the side pockets 154.

Figure 6:
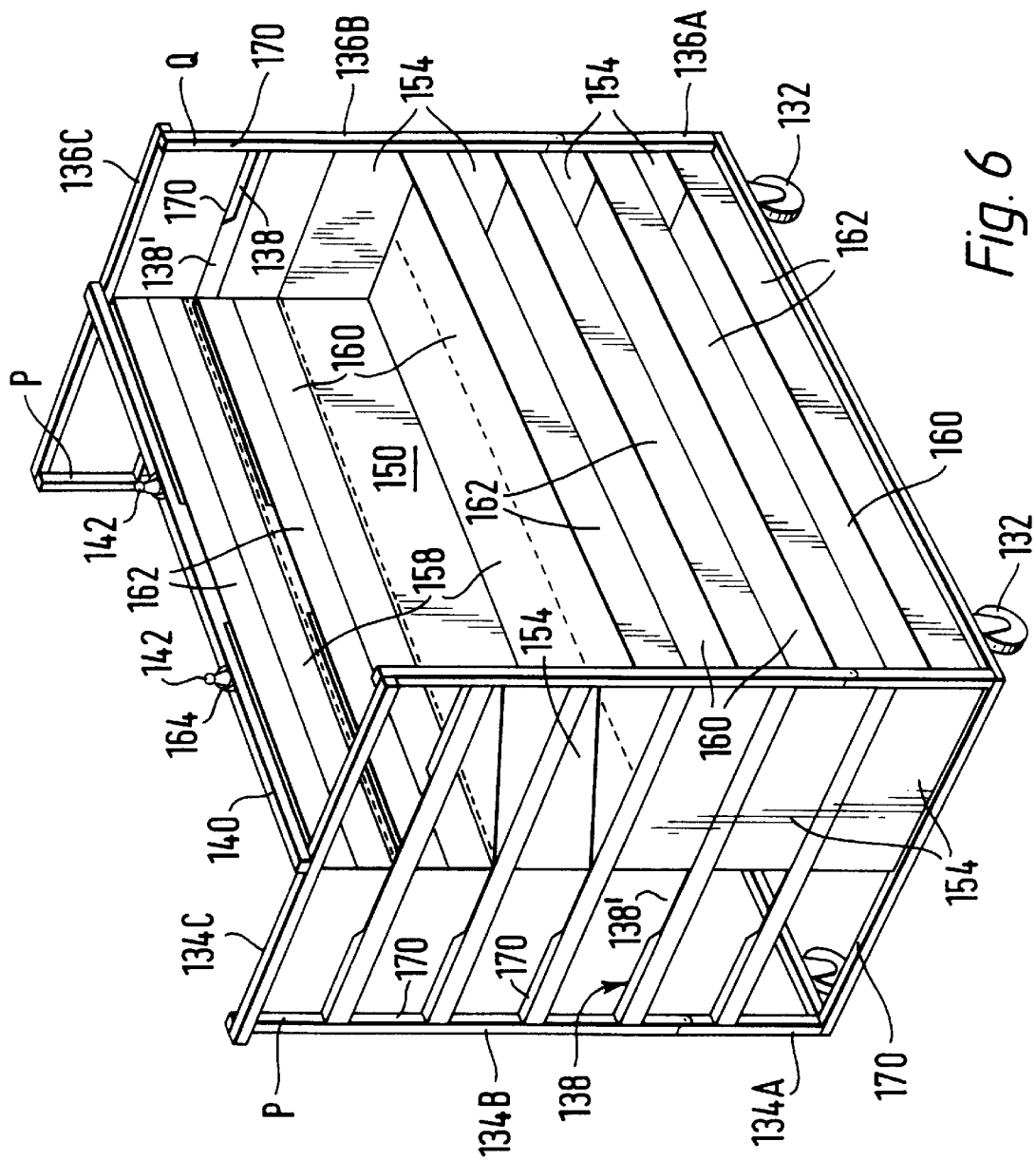
FIG. 6 shows a container comprising the fabric container part of FIG. 5 in the framework of FIG. 4.
Figure 7:
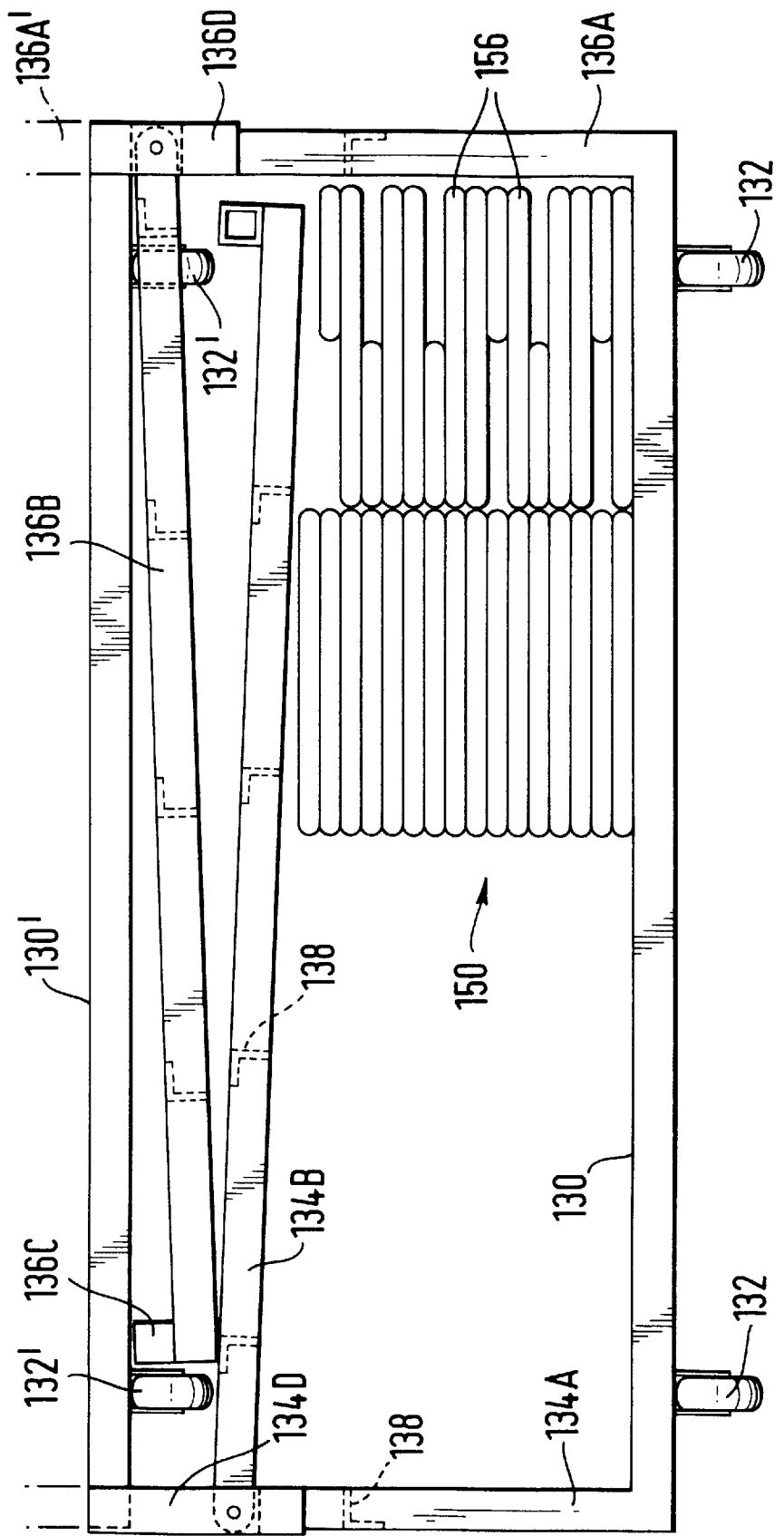
FIG. 7 illustrates the container of FIGS. 4, 5 and 6 collapsed.

FIG. 6 shows the framework of FIG. 4 supporting the fabric container part of FIG. 5. As shown in FIG. 6 the fabric container has been partially unfolded or extended so that the way in which it is supported in the framework may be more clearly seen.

It will be noted that the posts 134A and 134B and 136A and 136B as well as the upper surfaces of the base frame 130 and runners 138 in side frames have had applied to them strips of the material forming the attachment patches as indicated generally at 170.

The fabric container part is placed in the framework with the side pockets 156 and pockets 158, 160 and 162 held against or parallel to the back wall 130.

The top edge of the back wall 130 is then grasped and lifted upwardly so that the loops of material 164 on that edge can be placed over the spigots 142 on cross-bar 140. It will be appreciated that the cutout portions 138' of the runners 138 enable the container to be unfolded and lifted up between the side frames 134 and 136 in this operation.

Thereafter the lowermost fabric piece 156 is lifted from its engagement with the side pockets 154 and the pockets 158, 160 and 162 disengaged from one another. The fabric of the container is then manipulated so that the pockets 158 and 160 lie flat and the attachment patches on their lowermost surfaces (as viewed in FIG. 6) engage the patches provided on the base 130 of the framework. It will be seen the pockets 158 and 160 now form a base support element resting on the runners 138.

The pocket 162 is then folded up so that its outermost ends engage the attachment patches on the surfaces P of the side support posts 134A and 136A forming a base support front wall part.

The side pockets 154 are then dis-engaged from their contact with the back wall 150 and folded out until the attachment patches thereon engage the strips of material 170 provided on the surfaces Q of the side posts 134A and 136A.

It will be noted that in performing this manipulation a tray has been formed in the bottom of the framework by the container which covers half the base frame. This tray has an outer wall (formed by the pocket 162) which is of any desired height but preferably, as shown in the drawing, approximately half of the depth of pocket 154. The tray may be filled with any desired object—one particularly useful application of the storage device would be if the tray were filled with mail.

Placement of mail oriented in a particular sense in the tray will enable that mail to be moved, in the storage device, without the orientation of the mail items changing.

Once the tray has been filled—or before the tray has been filled—a second tray may be formed in the framework by bringing away from the back wall 150 of the container the pockets 154, 158, 160 and 162 of the fabric piece 156 next above that which has been unfolded.

The manipulation of this second fabric piece is in substance the same as the manipulation of the first with the pockets 158 and 160 being supported at the sides of the framework on the upper, attachment material covered, surfaces of runners 138.

Again an outer or front wall for this second tray is formed by the outermost pocket 162 of the second fabric piece and side walls for the tray are formed by the side pockets 154.

The container may be fully extended within framework by detaching the constituent parts of the other fabric pieces from the back wall of the container and bringing them into engagement with the members of the framework in the same way.

It is to be noted that the container occupies one half of the framework and it is envisaged that a second container, similar to the first, will be provided in the other half of the framework.

That other container will be supported in the same way as the first container—that is to say the loops on material 164 formed on the upper edge of the back wall of that other container will be engaged by the spigots 142 on the cross-bar 140 of the framework.

After use—when the container is empty and no longer required—it may be contracted within the framework by detaching the upper edge of the back wall 150 from the cross bar 140 of the framework (after having folded the various elements of the fabric pieces such that they lie against or parallel to the back wall 150). Thereafter the back wall may be folded down such that the fabric container part rests on the base of the framework.

As before the cut out sections 138' of the runners 138 enable the fabric container part to be folded down onto the base of the framework. As soon as the or both containers have been so folded down it is possible to disengage the cross bar 140 from its engagement with the side bar 134C (or 136C) and allow the cross bar to fall down such that it lies parallel with the side support 134 (or 136). Thereafter, the posts 134B are pivoted around their hinged connection to the post 134A so that the upper part of side support 134 lies across the base of the frame on top of the folded fabric container on the base. Once this has been effected side posts 136B are similarly pivoted around their hinged connection to the posts 136A such that the upper part of side support 136 overlies and rests upon the side part 134 as shown in FIG. 11. In FIG. 11 parts of a lower collapsed framework are shown supporting parts of another collapsed framework stacked thereon. References to the upper collapsed framework are distinguished by being prime.

The posts 134A and 136A are provided with short extensions 134D and 136D which are L-shaped in section and which permit the ready stacking of one collapsed framework upon the other.

It is envisaged, in certain circumstances, that the base of the framework will be provided as a solid panel forming the base of the container the lowermost fabric piece of the container may then be omitted if desired.

Variations which may be made to the described arrangements include, for example, the fact that the side frames may be provided as solid panel members having runners formed on their "inner" walls. In such an arrangement it is envisaged slots will be provided in the panels to accommodate the wheels 132 of an upper framework stacked on a lower one.

It will be appreciated that many modifications may be made to the form of container described with reference to FIGS. 4 to 7.

If desired the trays formed in the framework by the pockets 154, 158, 160 and 162 may be provided with divider walls. Such divider walls would comprise pockets substantially the same size as the pockets 154 and containing a rigid planar element. The pocket would be stitched along one of its shorter edges to the back wall 150 of the container and be pivotable from a position in which it lies against the back wall to a position in which it extends generally normally thereof and parallel to the side support elements 154 when the fabric container part is extended. Means may be provided (perhaps in the form of cooperating studs) on the pocket 162 to generally hold any such divider wall in a desired position.

It will be appreciated that the container described with reference to FIGS. 4 to 7 if desired, may be used to form trays the heights of which vary from those shown. For example if a set of pockets 154, 158, 160 and 162 were left folded against the back wall 150 of the fabric container part then the height of the tray immediately beneath those pockets would be substantially doubled.

The fabric container part, if desired, may be formed with one or more of the fabric pieces 156 omitted so that trays of different heights may be formed when the fabric container part is extended in the framework.

In such circumstances it is simply necessary that the positions at which fabric pieces 156 are provided on the back wall 150 of the fabric container part correspond with the heights of the runners 138 provided in the side frames 134 and 136.

The number of runners 138 provided in the framework (and trays formable in the extended container) may, of course, be varied from that shown.

As described the arrangement comprises a series of interconnected pockets in which a rigid planar pieces are placed. Desirably the fabric is woven polypropylene and the rigid planar elements are of moulded polypropylene.

It will of course be appreciated that any other suitable materials may be used to form the fabric container part for example the container may be made of any rigid material the parts of which are hinged or otherwise pivotally interconnected one to the other so that the container may adopt the extended form shown in the Figures.

A particularly useful modification provides that the container be made of a rigid, lightweight, plastics material and the pivotable interconnections are formed by having fold lines or living hinges of reduced thickness material at the appropriate locations. The further pieces 156 attached to the back wall 150 of the container would, in this arrangement, be welded thereto.

FIG. 8 shows a fabric container part similar to that of FIGS. 1 and 2 supported in the framework of FIG. 5 and similar parts are given the same reference numerals.

The fabric container part of FIG. 8 differs from that shown in FIG. 1 by being provided with loops of material 126' for engaging the spigots 142 on the cross bar 140 and a pair of hook members 121 at the top of each side wall 86 for engaging the side support bars 134C and 136C of the framework to hold the fabric container part open in the framework. The top wall of the fabric container part is now in two parts 96' formed as extensions to the front wall parts 90 and 92 and these two top parts are attachable one to the other and to the back and side wall by zippers 123. Finally, the top and base walls of the fabric container part are sized to fit half the frame of FIG. 4.

In other respects the form of the fabric container part and its mode of use are as described above and further description of it will not now be made.

Finally, it will be appreciated that the arrangements described are merely exemplary and that the dimensions and form of the containers (and of structures to be placed therein) may be varied to suit a particular users desire.

INDUSTRIAL APPLICABILITY

It will be seen from the foregoing description that the described embodiments provide for the ready and secure transport of postal items in and between postal sorting offices, and which also enables the cost of sorting the mail and of transporting mail containers (when both empty and full of mail) to be reduced in comparison to traditionally used methods and in comparison with more modern proposals.

It will also be seen from the foregoing description that described embodiments of the invention have practical utility in the secure transport of items within a commercial or industrial environment—by providing a container the configuration of which may readily be altered to adapt the container to different loads and uses, which may readily be used to allow items to be delivered to and collected from various departments in an office or factory, and which—when not in use—may be readily and easily stored.

I claim:

1. A collapsible container configurable to provide a plurality of separate compartments, the container comprising in combination a framework and a flexible fabric part with a back wall having mounted thereon at least one set of parts, each of which sets comprises two or more rigid side support elements each movable from a first position in which it is held against or parallel to the back wall to a second position in which it extends normally of the back wall, and a base support element movable from a first position in which it lies generally parallel with the back wall to a second position in which it extends normally of the back wall and is supported by said runner elements of the framework, the side and base support elements being located on the back wall such that when they are in their respective second positions they define compartments of the container.

2. A container as claimed in claim 1, wherein the base support elements of each of said set of parts is formed in two sections, which are foldable from a first position in which they overlie one another and are generally parallel to the back wall of the container to said second position.

3. A collapsible container releasably mountable in a framework and when so mounted configurable to provide a plurality of separate compartments, the container being of a flexible textile fabric and comprising a back wall having mounted thereon at least one set of parts, each of which comprises two or more rigid side support elements each movable from a first position in which it is held against or parallel to the back wall, and a base support element movable from a first position in which it lies generally parallel to the back wall to a second position in which it extends normally of the back wall, the side and base support elements being located on the back wall such that when they are in their respective second positions they define compartments of the container.

4. A container as claimed in claim 3, wherein each said side support element comprises a fabric pocket carrying therein a rigid planar piece.

5. A container as claimed in claim 4, wherein the edges of the side support elements spaced from their connection to the back wall are interconnected by a flexible web.

6. A container as claimed in claim 5, wherein each base support element has associated therewith three side support elements, said side support elements being connected to the back wall at equal spacing.

7. A container as claimed in claim 6, which further comprises fabric base and top walls, side walls and front and rear walls, wherein the top wall is integrally attached to the back wall and releasably attachable to the upper margins of the front side walls.

8. A container as claimed in claim 7, wherein the front wall is in two parts each of which is integrally attached to the base wall and a respective side wall and opposed margins of two front wall parts are releasably attached one to the other to form a single front wall when the container is closed.

9. A container as claimed in claim 8, wherein the relatable attachment of the top wall to the side and front wall parts, and of the two parts of the front wall to each other, is effected by zippers.

10. A container as claimed in claim 4, wherein each base support element comprises one or more fabric pockets each carrying therein a rigid planar piece.

11. A container as claimed in claim 10, wherein said planar pieces are of generally rectangular form.

12. A container as claimed in claim 11, wherein the material of the textile fabric of the container and of the rigid planar parts is polypropylene.

13. A container as claimed in claim 3, wherein the base and side support elements are hingeably connected to the back wall of the container by stitching the fabric of the support elements to said back wall.

14. A container as claimed in claim 13, wherein the base support elements of each said set of parts is formed in two sections, which are filmable from a first position in which they overlie one another and are generally parallel to the back wall of the container to said second position.

15. A container as claimed in claim 14, wherein the edge of each base support element spaced from the back wall is provided with a fabric front wall part hingeably interconnected by being stitched thereto, said front wall part being movable about the hinge axis from a position in which it lies on said base support element to a position in which it upstands from the base support element.

16. A container as claimed in claim 15, wherein the base elements, when in their said second positions are supported upon a base wall of the framework or upon the upper edges of the side support elements next to and below them.

17. A container as claimed in claim 12, wherein the back wall may, when said base and side support elements are in their said first positions, be released from the framework and be folded.

18. A container as claimed in claim 17, wherein the uppermost edge, in use, of the back wall is provided with means for engaging the framework so that the back wall is held in an extended condition.

19. A container as claimed in claim 18, wherein said back wall is filmable and comprises a series of separate pockets each containing a rigid planar piece.

20. A container as claimed in claim 3, wherein means for holding the base and side support elements in said first positions in the framework comprises any suitable stud, hook or the like arrangement.

21. A container comprising a rigid framework in combination with one or more textile fabric containers as claimed in claim 3, the rigid framework having a rectangular base frame with side frames upstanding from two opposed sides thereof, the side frames comprising sheets of metal forming rigid walls on opposite sides of said container, said sheets carrying metal runner elements for supporting the base support elements of each fabric container in their second positions.

22. A container comprising a rigid framework in combination with one or more textile fabric containers each as claimed in claim 3, the rigid framework having a rectangular base frame with side frames upstanding from two opposed sides thereof, wherein said side frames comprise posts interconnected by runner elements for supporting the base support elements of each fabric container in their said second positions.

23. A container comprising a rigid framework in combination with one or more textile fabric containers as claimed in claim 3, the rigid framework having a rectangular base frame with side frames upstanding from two opposed sides thereof, wherein a cross bar extends between the midpoints of the upper edge of each side frame and each fabric container back wall has at its upper edge loops of material attachable to hook means on the cross bar to hold each fabric container extended.

24. A container comprising a framework for supporting one or more fabric container parts, each of said fabric container parts comprising a back wall, base and side support elements and each of said fabric container parts having a first closed position and a second opened position, said framework capable of supporting the back wall and supporting the base and side support elements when in their said second positions, wherein each fabric container part is further provided with top, side, and front walls, and wherein the fabric container is held supported in the framework by fabric material pieces forming loops near the upper edges of the side and back walls of the fabric container part and which are engagable by hook members forming part of said framework.

25. A framework as claimed in claim 24, wherein the framework includes elements movable between positions in which each fabric container part is contracted and in which each fabric container part is held extended by the framework.

26. A framework as claimed in claim 25, wherein said framework is adapted for stacking upon a similar framework when contracted.

27. A framework as claimed in claim 25, wherein elements of the framework which are movable, are hingeably interconnected with other elements of the framework.

28. A framework as claimed in claim 25, when provided with a rigid base formed integrally on opposed sides thereof with first rigid side frame parts extending substantially normally of the base, second rigid side frame parts being hingeably coupled to each of said first side frame parts, each being movable between a position lying in the plane of its associated first side frame part and substantially parallel to the plane of the opposed second side frame of the framework.

29. A framework as claimed in claim 28, wherein the framework includes a cross bar operable to extend between the second side supports and to hold the second side frame parts in the planes of their associated first side frame parts.

30. A framework as claimed in claim 29, wherein the cross-bar is releasably attachable to both second side frame parts.

31. A framework as claimed in claim 29, wherein the cross-bar is releasably attachable to one second side frame part and hingeably coupled to the other second side frame part.

32. A framework as claimed in claim 31, wherein the hingeable interconnection of the second side frame parts to the first said frame parts at different sides of the frame base is effected at different distances from the frame base.

33. A framework as claimed in claim 32, wherein the textile fabric container part is integrally attached to the framework.

34. A framework as claimed in claim 33, wherein a base wall of the textile fabric container part is attached to the framework base.

35. A framework as claimed in claim 34, wherein the textile fabric container part is attachable to the cross-bar.

36. A framework as claimed in claim 35, wherein the first and/or second side frame parts comprise a network of interconnected rigid runner elements.

37. A framework as claimed in claim 35, wherein the first and/or second side frame comprises solid, panel, members on which are supported rigid runner elements.

* * * * *

UNITED STATES PATENT AND TRADEMARK OFFICE
CERTIFICATE OF CORRECTION

PATENT NO. : 5,881,895
DATED : March 16, 1999
INVENTOR(S) : Michael C. Linnell

It is certified that error appears in the above-identified patent and that said Letters Patent is hereby corrected as shown below:

Claim 17, line 1, replace "12" with --13--.

Signed and Sealed this

Seventh Day of September, 1999

Attest:

Q. TODD DICKINSON

Attesting Officer

Acting Commissioner of Patents and Trademarks

UNITED STATES PATENT AND TRADEMARK OFFICE
CERTIFICATE OF CORRECTION

PATENT NO. : 5,881,895
DATED : March 16, 1999
INVENTOR(S) : Michael C. Linnell

It is certified that error appears in the above-indentified patent and that said Letters Patent is hereby corrected as shown below:

Claim 17, line 1, replace "12" with --13--.

Signed and Sealed this

Twenty-eighth Day of September, 1999

*Attest:*

Q. TODD DICKINSON

*Attesting Officer*     *Acting Commissioner of Patents and Trademarks*